United States Patent
Takahashi

(10) Patent No.: US 7,500,727 B2
(45) Date of Patent: Mar. 10, 2009

(54) INK JET PRINTING APPARATUS AND INK JET PRINTING METHOD

(75) Inventor: Kiichiro Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/355,077

(22) Filed: Jan. 31, 2003

(65) Prior Publication Data
US 2003/0146946 A1    Aug. 7, 2003

(30) Foreign Application Priority Data
Feb. 4, 2002    (JP) ............................. 2002-027474

(51) Int. Cl.
B41J 29/38 (2006.01)
B41J 2/21 (2006.01)
B41J 2/15 (2006.01)

(52) U.S. Cl. .............................. 347/12; 347/14; 347/41; 347/43

(58) Field of Classification Search ..................... 347/9, 347/14, 15, 41, 43, 12, 40
See application file for complete search history.

(56) References Cited

U.S. PATENT DOCUMENTS

| | | | |
|---|---|---|---|
| 4,313,124 A | 1/1982 | Hara | |
| 4,345,262 A | 8/1982 | Shirato et al. | |
| 4,459,600 A | 7/1984 | Sato et al. | |
| 4,463,359 A | 7/1984 | Ayata et al. | |
| 4,558,333 A | 12/1985 | Sugitani et al. | |
| 4,608,577 A | 8/1986 | Hori | |
| 4,723,129 A | 2/1988 | Endo et al. | |
| 4,740,796 A | 4/1988 | Endo et al. | |
| 5,764,254 A * | 6/1998 | Nicoloff et al. | 347/43 |
| 6,086,185 A * | 7/2000 | Inui et al. | 347/43 |
| 6,149,264 A * | 11/2000 | Hirabayashi et al. | 347/43 |
| 6,390,586 B1 | 5/2002 | Takahashi et al. | |
| 6,719,402 B2 * | 4/2004 | Nakagawa et al. | 347/37 |
| 6,805,422 B2 * | 10/2004 | Takahashi et al. | 347/15 |
| 2002/0039192 A1 * | 4/2002 | Otsuka et al. | 358/1.9 |
| 2002/0113758 A1 | 8/2002 | Nishikori et al. | |

FOREIGN PATENT DOCUMENTS

| | | | |
|---|---|---|---|
| JP | 54-56847 | 5/1979 | |
| JP | 59-123670 | 7/1984 | |
| JP | 59-138461 | 8/1984 | |
| JP | 60-71260 | 4/1985 | |
| JP | 7-25036 | 1/1995 | 347/43 |
| JP | 8-150737 | 6/1996 | 347/43 |
| JP | 2001-150703 | 6/2001 | |

* cited by examiner

Primary Examiner—Julian D Huffman
(74) Attorney, Agent, or Firm—Fitzpatrick, Cella, Harper & Scinto

(57) ABSTRACT

This invention provides an ink jet printing method which ejects different kinds of ink from print heads onto a print medium to form an image according to print data transferred from a predetermined print data source and which can deal with both a normal print data transfer mode and an offset transfer mode. This printing method discriminates the data transfer mode of the print data transferred from the predetermined print data source and sets, in each of the print heads independently, positions of those of the plurality of nozzles that are to be used for printing. Then, the printing method controls the positions of the nozzles to be used according to the data transfer mode discriminated.

6 Claims, 9 Drawing Sheets

INK JET PRINTING APPARATUS AND INK JET PRINTING METHOD

This application claims priority from Japanese Patent Application No. 2002-027474 filed Feb. 4, 2002, which is incorporated hereinto by reference.

BACKGROUND OF THE INVENTION

1. Field of the Invention

The present invention relates to an ink jet printing apparatus and an ink jet printing method capable of forming color images by ejecting different kinds of ink from print heads according to print data transferred from a print data source.

The present invention is applicable to any apparatus that uses print mediums such as paper, cloth, leather, nonwoven cloth, OHP sheets and even metals. Examples of applicable apparatus include office automation equipment, such as printers, copying machines and facsimile machines, and industrial manufacturing equipment.

2. Description of the Related Art

Today, with office automation equipment such as personal computers and word processors in widespread use, a variety of printing apparatus and printing methods have been developed to record information entered from these equipment onto the above-described printing mediums. As an information processing capability of office equipment in particular continues to advance, there is a growing trend toward video information going color. In response to this trend, an increasing number of printing apparatus used to output the processed information also are being provided with a color printing capability.

Printing apparatus capable of producing color images are available in various types in terms of cost and function, from an inexpensive one with relatively simple functions to a multifunctional one that can select a desired printing speed and print quality according to the kind of image to be printed and the purpose of use.

Ink jet printing apparatus have features of, for example, low noise, low running cost, small size and ease with which color printing can be introduced, and thus are in wide use with printers, copying machines and facsimile.

Color ink jet printing apparatus generally perform a color printing by using three color inks, cyan, magenta and yellow, or four color inks including black in addition to the three primary inks.

The printing of color images is normally performed according to print data transferred from a host computer or the like. The transfer of print data, for example, is carried out as follows.

In a serial printing apparatus that performs printing by scanning a print head, image information for each color is transferred for each raster or for each line made up of a plurality of rasters, the rasters extending in a main scan direction (hereinafter also referred to as a raster direction) in which the print head is moved. That is, the Y/M/C/Bk image data for the same raster or the same line are transferred and this is followed by the Y/M/C/Bk image data for the next raster or line being transferred.

The most common print data transfer specification is Centronics which transfers data in parallel. The currently available Centronics specification is for one-way data transfer from the host computer to the printing apparatus. A two-way Centronics specification for bidirectional data transfer is being established. In recent years a system called the USB specification is also available which controls bidirectional data transfer between the host computer and the printer.

In conventional ink jet printing apparatus, to produce a color image with high color saturation without ink spreading, it has been a common practice to use dedicated paper that has an ink absorbing layer. Today, a new type of printing apparatus has emerged which, because of improvements made on ink, has a capability to print on plain paper that is widely used in large quantities as in printers and copying machines.

As a printing means for performing a color printing using two or more color inks, a so-called lateral array print head configuration is used in which nozzle groups (nozzle groups to be used), one for each color ink, are arranged one behind the other in the main scan direction so that each of the nozzle groups ejects ink droplets onto the same raster during the same scan.

In an ink jet printing apparatus using this lateral array print head configuration, there is a problem that since the next color ink lands on a print medium before the previously ejected color ink becomes fixed on the medium, these different color inks may spread and mix together. Particularly in plain paper, because of its ink soaking characteristic, different color inks easily spread one over the other and mix. If the intercolor bleeding occurs between a black ink and any other color ink, this clearly shows up, degrading the image quality significantly.

One method of addressing this problem uses a so-called longitudinal array print head configuration, in which the active nozzle groups assigned one to each different color are arranged such that at least one color ink nozzle group (for example, black ink nozzle group) is located at a position different from other color ink nozzle groups in a subscan direction (column direction). In this longitudinal array system, since the landing order (or overlapping order) of ink droplets ejected from different color ink groups does not change between a forward pass printing and a return pass printing, a resultant hue of the printed image does not change even if a bidirectional printing is performed. This allows a high-speed printing without having to execute complex image processing during the forward and backward passes. Further, since the time after the dots of one color land on specific rasters until dots of a different color land on the same rasters drastically increases, the quality of the printed image improves.

With the above system, it is possible to minimize undesired effects that the combined characteristics of plain paper and inks have on the image quality, thus realizing both high-speed printing and high-quality printing in one printing apparatus.

However, when the longitudinal array print head configuration is used, a bit map memory area in which image data is mapped (hereinafter referred to as a print buffer) needs to be made significantly larger than when the lateral array print head configuration is used. How large a print buffer area is required by the longitudinal array print head configuration will be explained in detail as follows by referring to the drawings.

FIG. 1 is a schematic diagram showing the longitudinal array print head configuration and its print buffer area. Here, it is assumed that the longitudinal array print head configuration has Y, M and C color ink heads each with (n+127) nozzles and a Bk ink head with (n+383) nozzles. These print heads of the four color inks are arranged in the order of Y, M, C and Bk in the main scan direction.

In this longitudinal array print head configuration, when the nozzle group used for ejecting Y ink performs printing in a raster range from an nth raster to an (n+127)th raster, the nozzle groups for M and C inks also print in the same raster range of nth to (n+127)th raster and the nozzle group for Bk ink prints in a raster range from an (n+256)th raster to an (n+383)rd raster.

As described above, print pixel data for each color is transferred from an external device (data source) such as a host computer to the printing apparatus one raster data or one line data at a time. Hence, in the longitudinal array print head configuration shown in FIG. 1, the print operation cannot start before the Y, M and C print data for nth to (n+127) raster and the Bk print data for (n+256)th to (n+383)rd raster are mapped into the print buffer.

If, for example, the Y, M and C print data for nth to (n+127)th raster are mapped into the Y, M and C print buffers and ready to be printed, the Bk print data for (n+256)th to (n+383)rd raster, which is to be fed to the active Bk nozzle group, is not yet mapped into the print buffer at this time, so that the active Bk nozzle group cannot start printing. It is thus necessary to keep the Y, M and C color nozzle groups waiting until the Bk print data for (n+256)th to (n+383)rd raster is mapped into the print buffer. Therefore, while the Bk print buffer needs only to have a memory capacity corresponding to 128 rasters of data from (n+256)th to (n+383)rd raster, the Y, M and C color buffers are each required to have a memory capacity capable of storing 384 rasters of data from nth to (n+383)rd raster. That is, the memory capacity for each color must be large enough to hold 384 rasters of print data, as shown in FIG. 1.

Here, if it is assumed that the resolution of the printing apparatus is 600 dpi, an image to be printed is A4 size and each raster has 4,800 pixels, then 384 rasters of print data require a 1,843,200-bit (=384 rasters×4,800 pixels) memory capacity to store. Similarly, Y print data, M print data and C print data each require a memory capacity of 1,843,200 (=384 rasters×4,800 pixels) bits, and the Bk print data requires a memory capacity of 614,400 bits (=128 rasters×4,800 pixels). Thus, summing the Y, M, C and Bk print data, a total of at least 6,144,000 bits of memory area is required.

On the other hand, the print buffer area referenced during one printing scan is 614,400 bits (=128 rasters×4,800 pixels) for each color, or a total of 2,457,600 bits for all Y, M, C and Bk colors, and it follows therefore that the minimum required memory capacity is less than half the 6,144,000 bits.

As can be seen from above, the conventional printing apparatus using the longitudinal array print head configuration requires a large-capacity print buffer (memory), which pushes up the cost of the apparatus. Further, since the time from the start of transferring print data from the host computer to the printing apparatus to the start of printing increases, the overall printing time also increases.

In the longitudinal array print head configuration in which a plurality of nozzle groups assigned one to each of different colors are arranged at different positions (offset) in the subscan direction, an offset transfer mode or mode may be employed. In this offset transfer mode the host computer performs offset processing to change the order of transfer of the print data according to the amounts of offset of the associated nozzle groups and successively transfers the print data offset in the subscan direction to the associated nozzle groups.

In this offset transfer mode, if an expensive high-performance host computer is used, there is no problem in executing the offset processing at high speed. With an inexpensive, low-performance host computer, however, performing the above-described data processing and the offset processing while transferring the print data is too large a burden and it may not be able to execute a smooth printing operation. Further, depending on the operating system (OS) used, the large burden of the offset transfer may render it impossible to offset and transfer the print data.

As described above, because in conventional printing apparatus the print data transfer mode is determined according to the nozzle group configuration, the printing operation may take a large amount of time or the data transfer may become impossible depending on the host computer used.

SUMMARY OF THE INVENTION

The present invention can overcome the problems experienced with the above-described prior art and provides an ink jet printing apparatus and an ink jet printing method, which can deal with both the normal print data transfer mode and the offset transfer mode by changing the positions of nozzles used in the print heads according to the transfer mode of the print data transferred from the print data source, such as a host computer.

In one aspect, the present invention provides an ink jet printing apparatus having a printing means, wherein the printing means has an array of print heads, each formed with a plurality of nozzles for ejecting ink, the print heads being adapted to eject different kinds of ink onto a print medium to form an image according to print data transferred from a predetermined print data source, the ink jet printing apparatus comprising: a discrimination means for disciminating a data transfer mode of the print data transferred from the predetermined print data source; and a print head control means for setting, in each of the print heads independently, positions of those of the plurality of nozzles that are to be used for printing; wherein the print head control means controls the positions of the nozzles to be used according to the data transfer mode which is discriminated by the discrimination means.

In another aspect, the present invention provides an ink jet printing method using a printing means, wherein the printing means has an array of print heads, each formed with a plurality of nozzles for ejecting ink, the print heads being adapted to eject different kinds of ink onto a print medium to form an image according to print data transferred from a predetermined print data source, the ink jet printing method comprising: a discrimination step for discriminating a data transfer mode of the print data transferred from the predetermined print data source; and a nozzle setting step for setting, in each of the print heads independently, positions of those of the plurality of nozzles that are to be used for printing; wherein the positions of the nozzles to be used are controlled according to the data transfer mode discriminated by the discrimination step.

With the above construction it is possible to use, for printing, optimum nozzles for the print data transfer mode set. That is, in the normal print data transfer mode, the nozzle positions to be used for printing are determined so as to keep the amount of memory used in the printer as small as possible. In this case, the print data source, such as a host computer, does not perform the offset processing in which the print data is offset before being supplied to the printing apparatus.

Further, for an improved print quality, a so-called longitudinal array print head configuration is used, in which at least one color ink nozzle group (for example, black ink nozzle group) is located at a position different from other color ink nozzle groups in a subscan direction (column direction).

In the offset transfer mode, the printing apparatus automatically sets the active nozzle positions according to the amount of offset of the print data transferred from the host computer. So, if the offset is within the number of nozzles of the print heads, there is no need for the printing apparatus to set the active nozzle positions in advance, allowing the optimum nozzles to perform printing reliably. The present invention therefore enables the printing apparatus to meet the requirements of both the normal print data transfer mode and the offset transfer mode.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Now, embodiments of the present invention will be described by taking as an example a serial printer type ink jet printing apparatus using a plurality of print heads.

In one embodiment of this invention, a printer driver and print data transfer mode information set in the printing apparatus are retrieved and, according to a set print data transfer mode, the positions in each print head of nozzles to be used are set for each print head.

In a normal print data transfer mode, the print data is successively transferred from the host computer to the printing apparatus in units of rasters or lines. The supplied print data is then mapped into the print buffer within its memory capacity provided in the printing apparatus to set the positions of active nozzles, which are used to perform printing.

In an offset transfer mode, the host computer performs offset processing in advance in which print data that assumes different positions (offset) in the subscan direction is transferred one raster or one line of data at a time. The printing apparatus then sets the nozzles to be activated according to the received print data. Therefore, it is possible on the host computer side to select desired positions at which the nozzles are to be activated.

Thus, if active nozzle groups in different print heads are set at advantageous positions in securing a good image quality, for example, at such positions as will form a predetermined space between the active nozzle group positions in different color print heads, the printing time interval between different color inks on the same printing areas can be kept constant, ensuring uniform color in each printing area. This arrangement can also reduce bleeding and mixing of different color inks and thus produce a satisfactory image quality.

Here, the printing operations performed in different transfer modes will be explained in more detail.

(Normal Print Data Transfer Mode)

The normal print data transfer mode (second print data transfer mode) performed in the embodiments of the invention will be explained.

Figure 2:
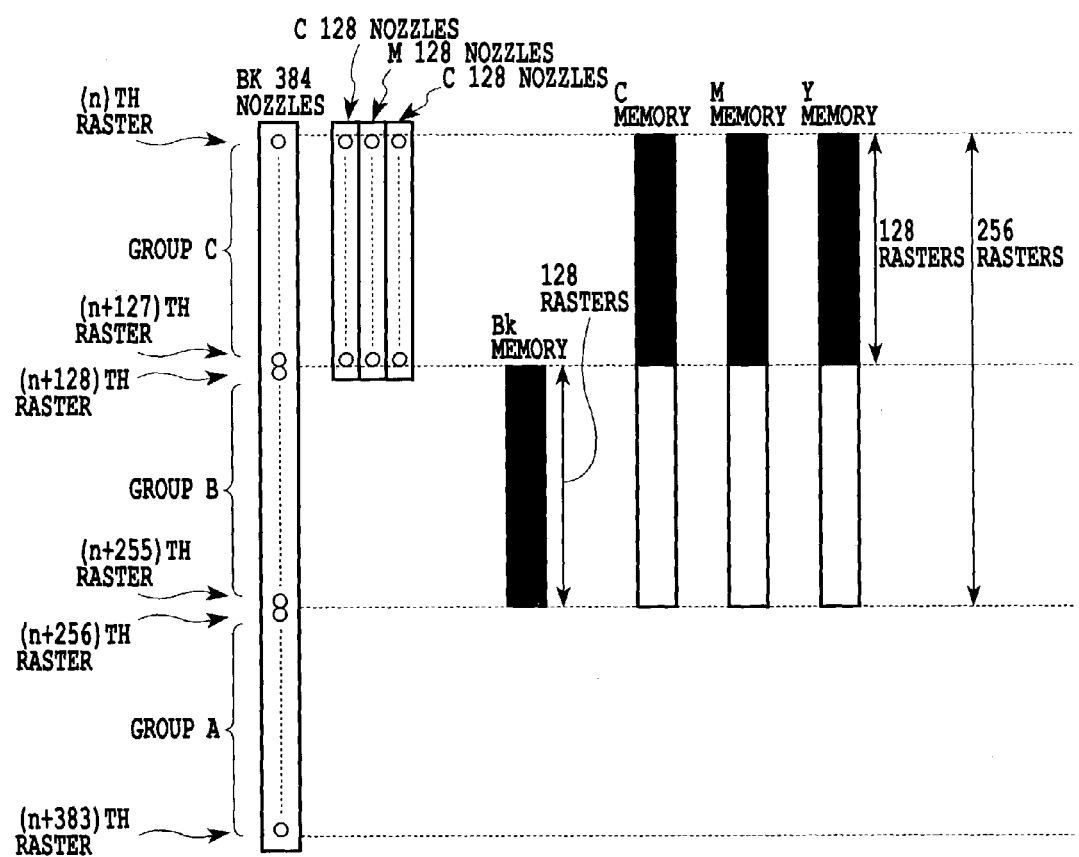
FIG. 2 is an explanatory diagram showing a longitudinal array print head configuration and an example of its print buffer area used during a normal transfer mode in one embodiment of the present invention.

FIG. 2 shows an example print head assembly used in the normal print data transfer mode.

Figure 1:
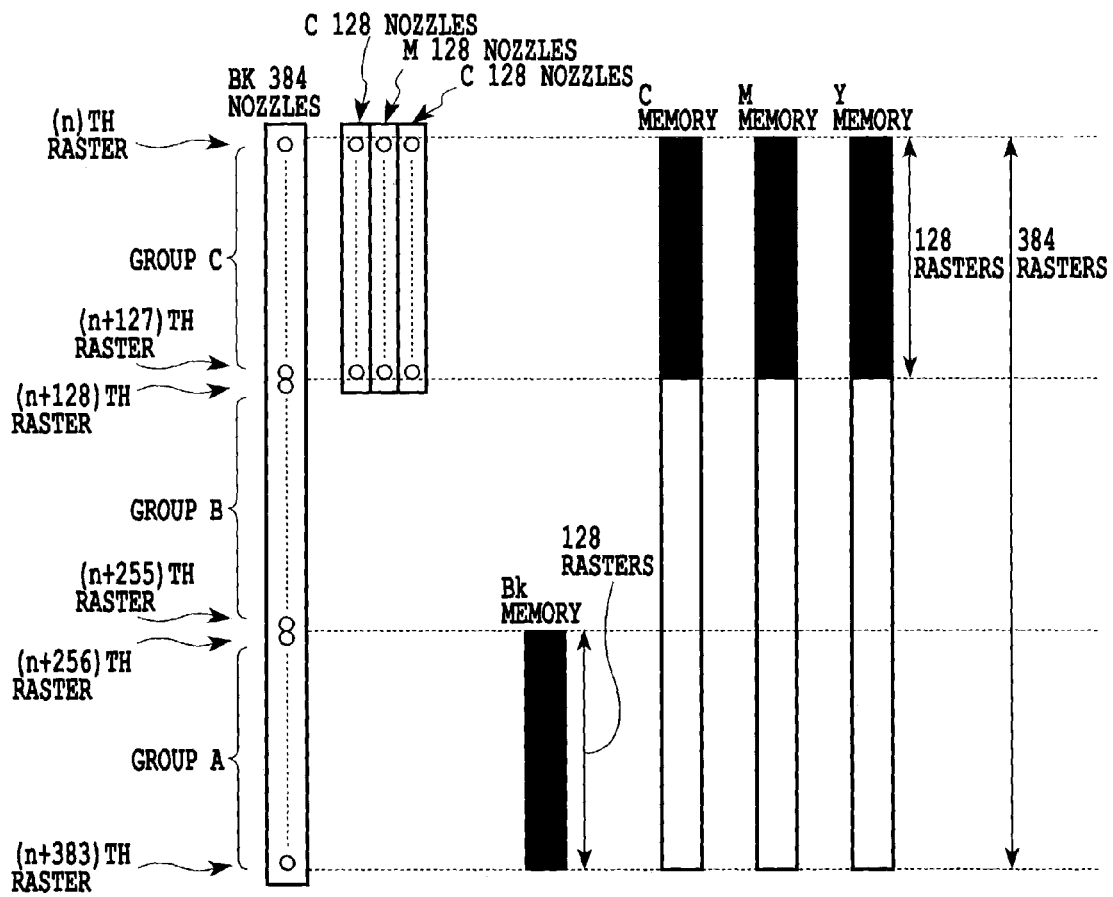
FIG. 1 is an explanatory diagram showing a longitudinal array print head configuration and its print buffer area in one embodiment of the present invention.

In the print head shown here, like the one shown in FIG. 1, the print heads for ejecting Y, M and C color inks have 128 nozzles each, arrayed in the subscan direction, and the Bk ink print head has 384 nozzles arrayed in the subscan direction. The Y, M and C print heads have their active nozzle groups arranged at positions different in the subscan direction than the active nozzle group of the Bk print head, thus constituting a so-called longitudinal array print head configuration.

In the print head shown in FIG. 2, the positions of active nozzle groups of the color ink print heads are shifted by 128 rasters from the active nozzle group of the Bk print head. In this respect the arrangement of FIG. 2 differs from that of FIG. 1. That is, in the print head of FIG. 1, the active nozzle groups of the color inks are positioned 256 rasters from the active nozzle group of the Bk ink.

In the Y, M and C print heads of FIG. 2, active nozzles are used for printing range from nth raster to (n+127)th raster. The Bk print head uses as active nozzles a nozzle group B ranging from (n+128)th raster to (n+255)th raster. In the case of FIG. 1, the Bk print head uses as active nozzles a nozzle group A ranging from (n+256)th raster to (n+383)rd raster.

If it is assumed that the printing apparatus has a resolution of 600 dpi, the image to be printed is A4 size, and the number of pixels in each raster is 4,800 pixels, then the print buffers for the Y, M and C print data need to have a memory capacity of 1,228,800 bits (=256 rasters×4,800 pixels) each to store 256 rasters of print data. The Bk print buffer is required to have a memory capacity of 614,400 bits (=128 rasters×4,800 pixels). Summing these required memory capacities for the Y, M, C and Bk print data means that the memory area must have a minimum required capacity of 4,300,800 bits. This is 70% of the memory requirement in the case of FIG. 1.

Next, the normal print data transfer mode when another print head is used will be explained based on FIG. 3.

The print head shown here has a configuration similar to those of FIG. 1 and FIG. 2. That is, the Y, M and C print heads each have 128 nozzles, the Bk print head has 384 nozzles, and these print heads are arranged in the order of Y, M, C and Bk in the main scan direction. The only difference from FIG. 1 and FIG. 2 is that in this print head of FIG. 3 the Bk print head uses as active nozzles a nozzle group C ranging from nth raster to (n+127)th raster. That is, the Bk print head, like the Y, M and C print heads, uses the nozzle group C (nth raster to (n+127)th raster) for printing. All the active nozzle groups, therefore, are arranged at the same positions in the subscan direction, constituting a so-called lateral array print head configuration.

If the resolution of the printing apparatus is 600 dpi, the image to be printed is A4 size and the number of pixels in each raster is 4,800 pixels, then each of the Y, M, C and Bk print buffers must have a memory capacity of 614,400 bits (=128 rasters×4,800 pixels) to store 128 rasters of print data. The total memory capacity of these print buffers is 2,457,600 bits, which is the overall minimum memory requirement. This memory requirement is 40% of that of the longitudinal array print head configuration of FIG. 1.

Figure 3:
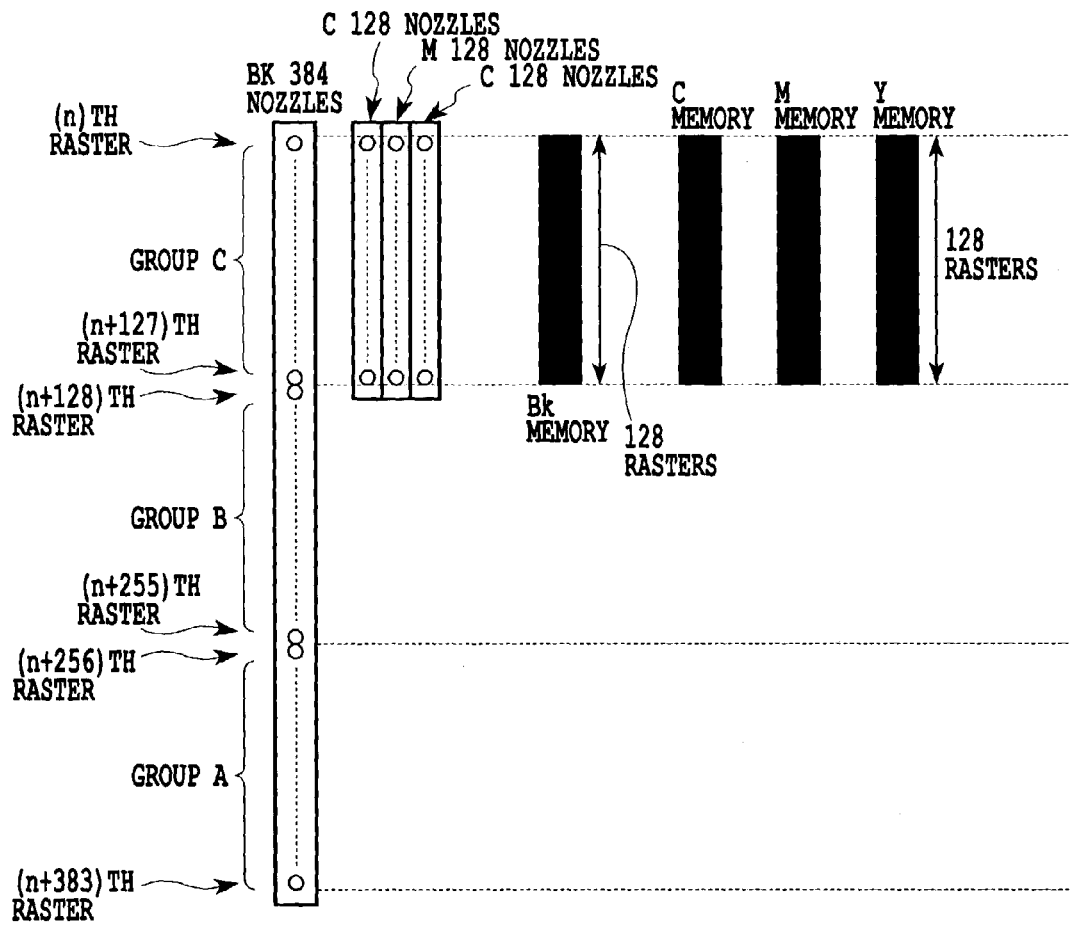
FIG. 3 is an explanatory diagram showing a longitudinal array print head configuration and an example of its print buffer area in one embodiment of the present invention.

As can be seen from FIG. 2 and FIG. 3, by setting the active Bk nozzle group closer to the active nozzle groups of the color print heads, the required memory capacity can be reduced.

As described above, when the normal print data transfer mode is adopted, by setting appropriate nozzle group positions for the printing apparatus or for the print head configuration it is possible to realize a one-pass bidirectional printing, the fastest printing in the printing apparatus, and also minimize the memory capacity required of the printing apparatus.

(Offset Transfer Mode)

Next, the offset print data transfer mode (first print data transfer mode) performed in the embodiments of this invention will be explained. In an example case described in the following, a one-pass bidirectional printing is performed for fast speed and a high-quality printing is also executed.

FIG. 1 shows an example print head configuration used. Print heads for Y, M and C color inks cover a range of nth raster to (n+127)th raster and the Bk print head covers a range of (n+256)th raster to (n+383)rd raster.

If the offset transfer is not executed, the total minimum required memory capacity for the Y, M, C and Bk print buffers is 6,144,000 bits, as described earlier. Performing the offset transfer by contrast can reduce the memory requirement for the Y, M, C and Bk print buffers to 2,457,600 bits in total, or 614,400 bits (=128 rasters×4,800 pixels) for each color. That is, the minimum required memory capacity can be set equal to the memory capacity for the nozzle position setting of FIG. 3, i.e., the minimum required of the system.

The printing operation performed by using the above-described print head configuration will be explained.

Figure 4:
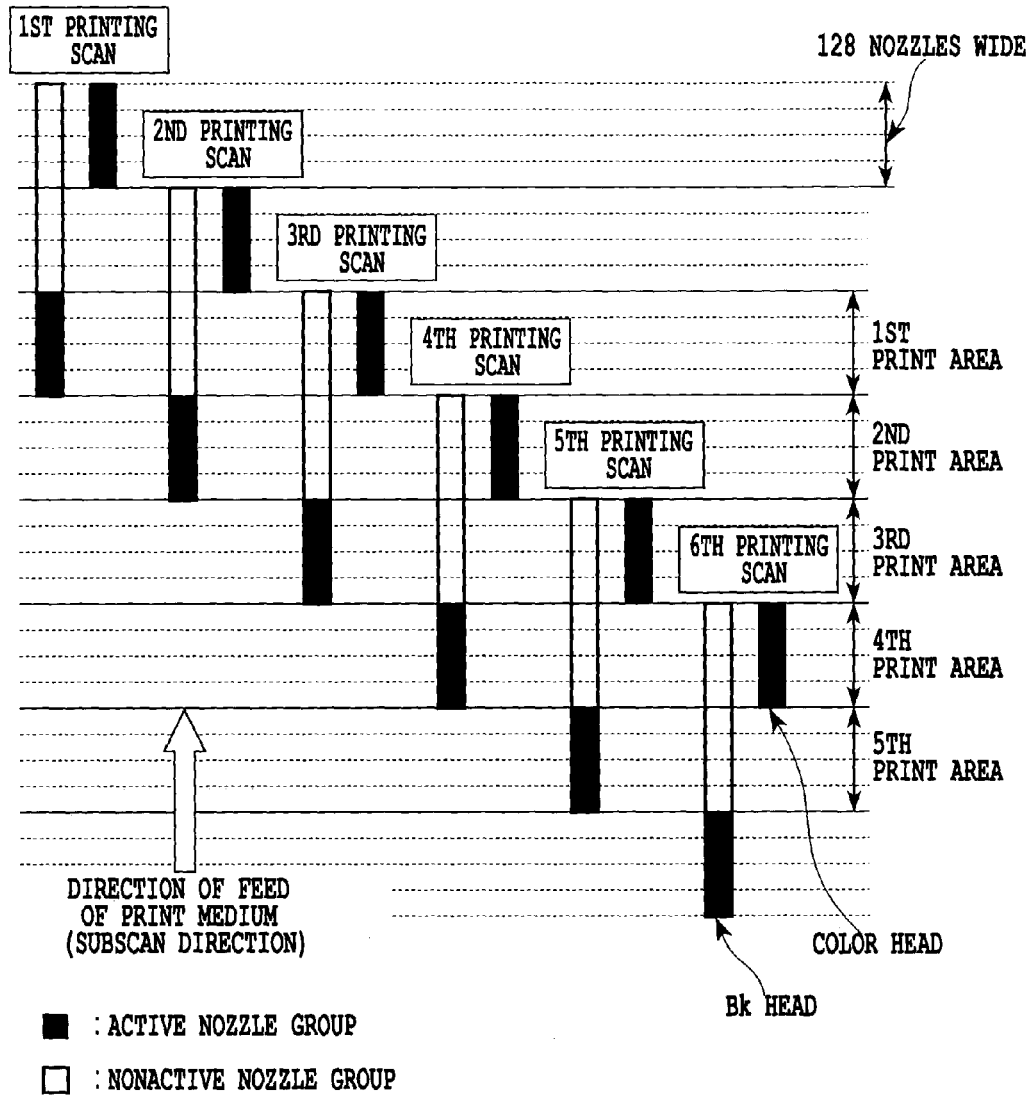
FIG. 4 is an explanatory diagram showing a one-pass bidirectional printing performed by the print head of FIG. 1.

FIG. 4 shows how the one-pass bidirectional printing is done by using the print head configuration of FIG. 1. In FIG. 4, during printing, a subscan is performed by feeding a print medium downward from above and the main scan is performed by moving the print head together with a carriage in a direction perpendicular to the subscan direction. That is, the print head performs printing as it is moved in the forward direction during odd-numbered printing scans and in the backward direction during even-numbered printing scans, thus executing the one-pass bidirectional printing. This printing operation will be explained in more detail as follows.

First, during a first printing scan the Bk print head prints on a first print area and, during a second printing scan, prints on a second print area.

Next, during a third printing scan the Bk print head prints on a third print area and at the same time the color print heads (C, M and Y print heads) print on the first print area.

Next, during a fourth printing scan the Bk print head prints on a fourth print area and at the same time the color print heads print on the second print area.

Next, during a fifth printing scan the Bk print head prints on a fifth print area and at the same time the color print heads print on the third print area.

In this way, the Bk head and the color heads perform printing on each of the print areas.

One feature to be noted here is the relation between the printing actions on one and the same print area by the Bk head and by the color heads. That is, the first print area is printed by the first and third printing scans in the forward direction and, the second printing scan in the backward direction performed between the first and third printing scans prints on the second print area. The second print area is printed by the second and fourth printing scans in the backward direction. During the third printing scan in the forward direction performed between the second and fourth printing scans, the printing is done on the first print area. This is followed by similar printing procedures on the third print area, fourth print area and so on.

In this high-quality printing operation, if we look at one print area, there is one nonprinting scan between the printing scans by a plurality of print heads. Although this nonprinting scan does not perform printing on that print area of interest, it does print on other print areas.

Therefore, on all print areas of interest, the printing by the Bk print head and the printing by the color print heads are performed with a predetermined, constant time difference. In other words, although the printing direction alternates on the successive print areas, each print area is printed by the black and the color print heads with a predetermined time interval interposed between the black ink printing and the color ink printing. Further, the adjoining print areas are printed at the same time intervals.

As described above, by setting the ink ejection time interval constant and providing a time between the black and color print head printing operations to allow the ink of each printing scan to get fixed, it is possible to substantially improve the quality of a printed image compared with that obtained with the lateral array print head configuration. That is, when the lateral array print head configuration is used, there is a possibility that bleeding may occur at a boundary between a black ink and color inks because of a difference in soaking characteristic between the black ink and the color inks. This intercolor bleeding at boundaries can be prevented by providing a space between the active nozzle groups of the Bk print head and the color print heads.

In this embodiment, the ink ejection time interval is set constant for all print areas. If there are print areas that may cause time interval variations, this does not pose any problem in practice if the variations fall within a few rasters. That is, if the print area dimensional variation is less than can cause visible image impairments, the resultant time difference variation or color variation does not pose a serious quality problem.

As described above, in a system with the offset data transfer mode activated, the nozzle groups are set at optimum positions according to the configuration of the printing apparatus and print head to meet requirements of one-pass bidirectional printing, the fastest printing in the serial printer type printing apparatus.

With this embodiment, the memory capacity required of the printing apparatus can be minimized and the optimum nozzle positions can be set according to the print quality required. The offset transfer increases the degree of freedom of the printing apparatus, allowing for a variety of ways the printing can be achieved.

For the offset transfer of print data, the host computer must temporarily store the print data. For example, in the print head shown in FIG. 1, no offset transfer is performed, i.e., normal print data transfer mode is used, and the memory area of 6,144,000 bits needs to be secured on the printing apparatus side. Performing the offset transfer can significantly reduce the required memory capacity of the print buffer to 2,457,600 bits. It is noted, however, 3,686,400 bits of print data, which is equal to the reduced amount of memory capacity, is temporarily stored in the host computer and, after the print data is offset, transferred to the printing apparatus.

That is, in the offset data processing performed as by a printer driver, the host computer is required to provide a memory area for temporarily storing the offset print data.

In the above embodiment, when the print data transfer mode is set by the host computer, information representing the data transfer mode is sent to the printing apparatus, which, according to the information received, activates appropriate nozzles for performing the printing operation. That is, in the normal print data transfer mode, the active nozzle groups are set at positions as appropriate for printing as possible; and in the offset transfer mode, a space corresponding to the amount of offset is provided between the active nozzle groups of different print heads and the printing is done using the active nozzle groups. In this way a single printing apparatus can cope with a plurality of data transfer modes. That is, if there are two or more print data transfer modes depending on the performance of the host computer and the OS used, these data transfer modes can be dealt with by a single printing apparatus.

Example embodiments of this invention will be described in detail by referring to the accompanying drawings. In the drawings, identical or corresponding parts are assigned like reference numbers.

First Embodiment

This embodiment of the invention concerns an ink jet printing in which ink is ejected from nozzles of a plurality of print heads onto a print medium to form an image and in which active nozzles are selected according to a transfer mode in which print data is transferred from the host computer to the printing apparatus (print data transfer scheme).

(Configuration of Printing Apparatus)

Figure 5:
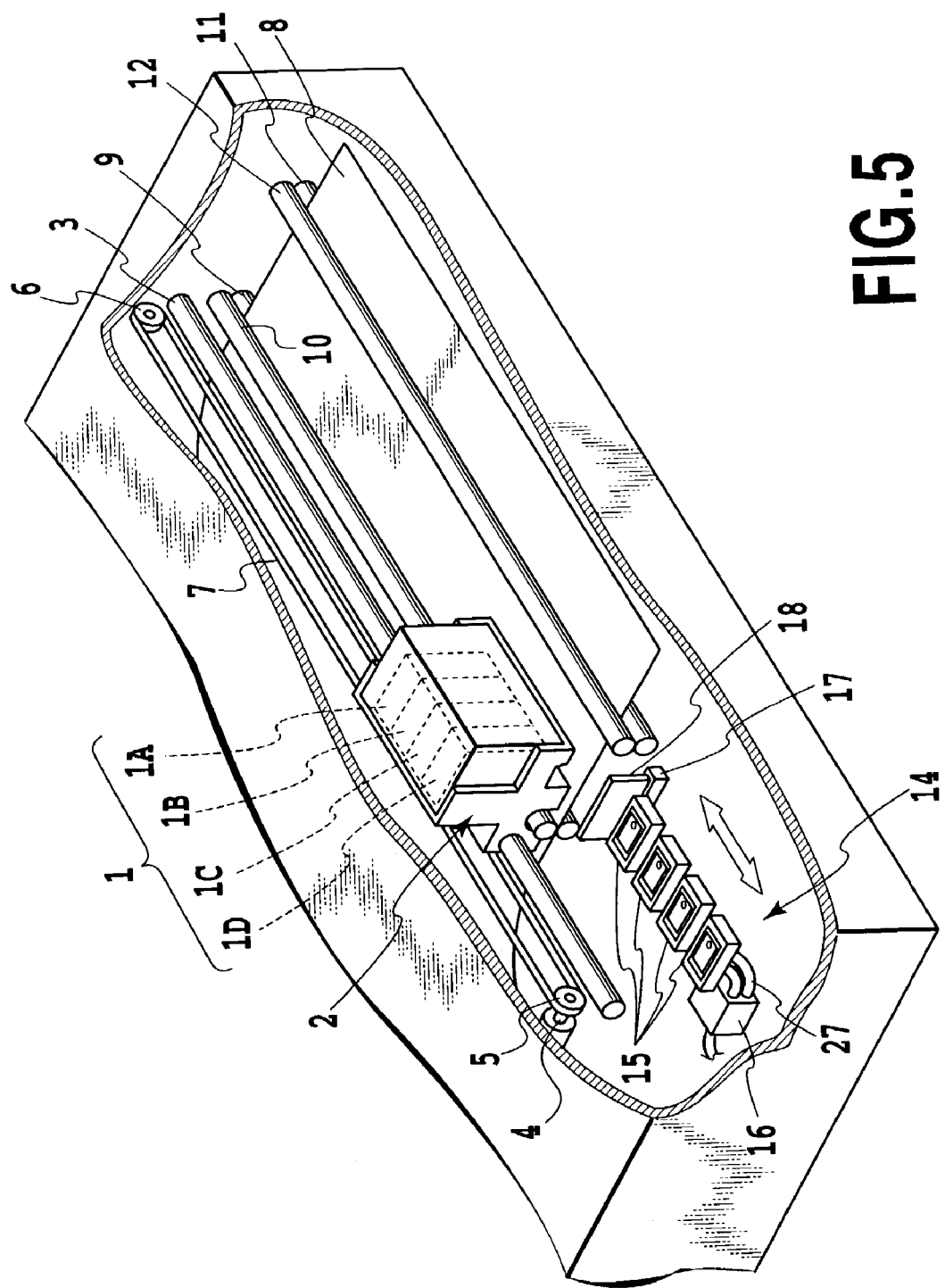
FIG. 5 is a partly cutaway perspective view showing an outline construction of an ink jet printing apparatus according to a first embodiment of the present invention.

FIG. 5 is a perspective view schematically showing a construction of essential portions of an example ink jet printing apparatus applying the present invention. In FIG. 5 a plurality (four) of head cartridges 1A, 1B, 1C, 1D are removably mounted on a carriage 2. The cartridges 1A-1D are each provided with a connector for receiving a signal to drive the print head. In the following description, an expression of "printing means (print head or head cartridge) 1" is used to denote the whole printing means 1A-1D or any one of them.

The plurality of cartridges 1 use different color inks and their ink tanks contain, for example, cyan (C), magenta (M), yellow (Y) and black (Bk) inks. Each printing means 1 is positioned and removably mounted on the carriage 2, which has a connector holder (electric connection unit) for transferring a drive signal or the like to each printing means 1 through the connector.

The carriage 2 is movably supported on a guide shaft 3 installed in the main scan direction in the apparatus body so that it can be guided along the guide shaft 3. The carriage 2 is driven by a main scan motor 4 through a motor pulley 5, a follower pulley 6 and a timing belt 7 for the control of its position and movement. A print medium 8 such as paper and plastic thin sheet is fed by the rotation of two pairs of feed rollers 9, 10 and 11, 12 to pass through a print operation area facing an ink ejection surface of a first print head H1. The print medium 8 is supported on its back by a platen (not shown) so that it can form a flat surface to be printed on. The cartridges 1 mounted on the carriage 2 are held so that their ink ejection surfaces protrude downwardly from the carriage 2 and are parallel to the print medium 8 between the two pairs of feed rollers.

Each of the print heads 1 is an ink jet printing means that ejects ink by thermal energy and has an electrothermal transducer for generating the thermal energy. The print head 1 ejects ink from its nozzles by utilizing a pressure change caused by growth and contraction of bubbles produced by a film boiling that is caused by the thermal energy from the electrothermal transducers.

Figure 6:
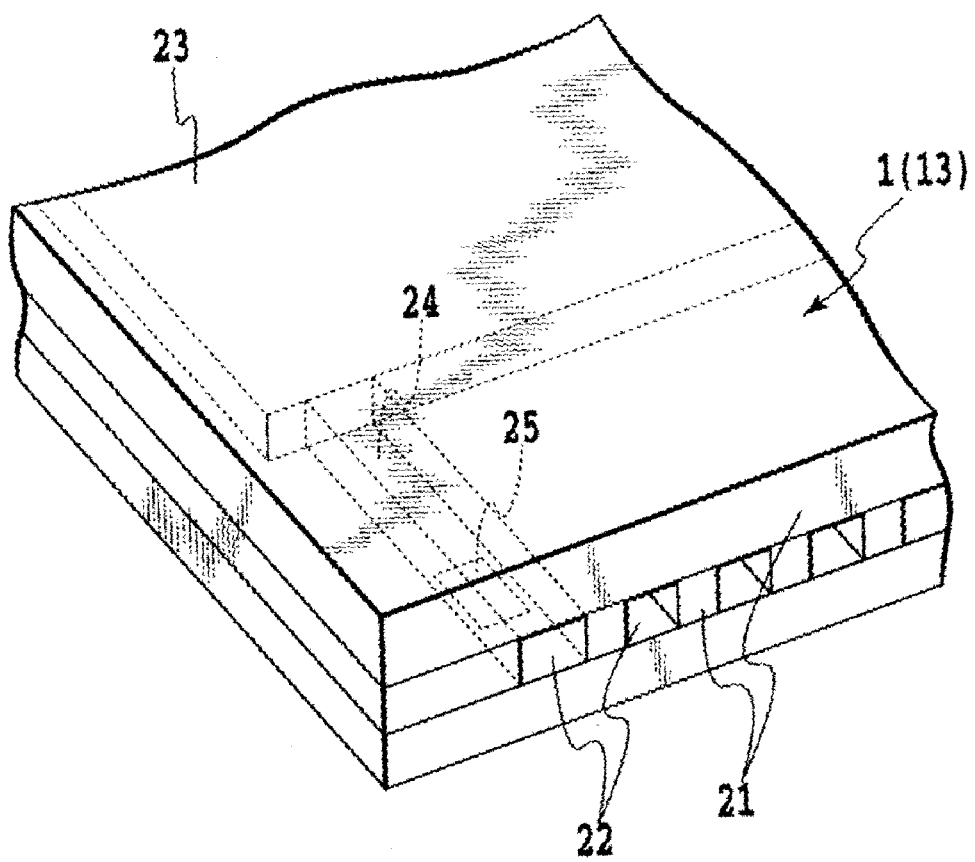
FIG. 6 is a schematic perspective view showing a construction of an essential part of an ink ejection portion of the print head of FIG. 1.

FIG. 6 is a perspective view schematically showing an essential construction of an ink ejection portion 13 of the print head. In FIG. 6, the ink ejection surface 21 facing the print medium 8 with a predetermined gap (about 0.5-2 mm) therebetween is formed with a plurality of ejection openings 22 at a predetermined pitch. An electrothermal transducer (heating resistor) 25 for generating an energy to eject ink is arranged along a wall surface of each path 24 that communicates each ejection opening 22 to a common liquid chamber 23. In this example, the print head 1 is mounted on the carriage 2 in such a manner that its ejection openings 22 are arrayed in a direction crossing the main scan direction of the carriage 2. According to a received image signal or ejection signal, the corresponding electrothermal transducer 25 is energized to film-boil the ink in the path 24 and, by using a pressure generated by the film boiling, expel an ink droplet from the ejection opening 22.

(Configuration of Control Circuit)

Figure 7:
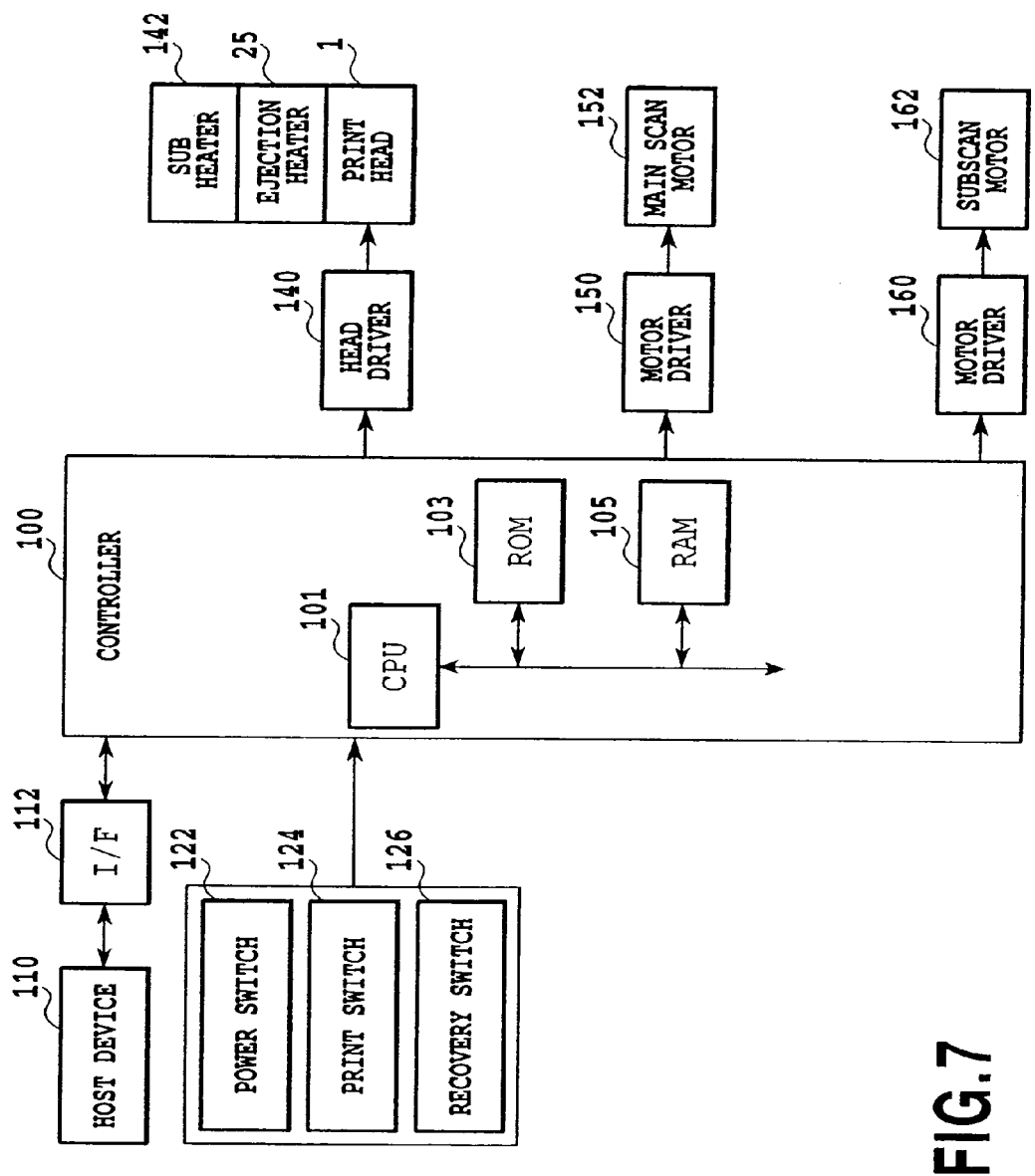
FIG. 7 is a block diagram showing an outline configuration of a control circuit in the ink jet printing apparatus according to the first embodiment of the present invention.

FIG. 7 shows an outline configuration of a control circuit in the ink jet printing apparatus shown in FIG. 1.

In FIG. 7, a controller 100 is a main control unit for the print head which has a CPU 101 in the form of a microcomputer, for example, a ROM 103 storing programs, tables and other fixed data, and a RAM 105 having an image data mapping area and a work area. A host device 110 is a source for supplying image data (it may be a computer for generating and processing print data or a reader for reading an image). The host device 110 transfers image data, commands and status signals to and from the controller 100 through an interface (I/F) 112.

An operation unit 120 has a group of switches operated by an operator, including a power switch 122, a printing start switch 124 and a recovery switch 126 for starting an operation of recovering an ejection performance by suction.

A head driver 140 energizes the nozzle heaters 25 in the print head 1 according to the print data. The head driver 140 includes a shift register for arranging the print data according to the positions of the nozzle heaters 25, a latch circuit for latching data at an appropriate timing, a logic circuit for energizing the nozzle heaters in synchronism with a drive timing signal, and a timing setting section for appropriately setting a drive timing (ejection timing) to align dot forming positions.

The print head 1 has a sub heater 142. The sub heater 142 adjusts a temperature to stabilize the ink ejection characteristic. It may be formed on the print head substrate simultaneously with the nozzle heaters 25 and/or attached to the print head body or head cartridge.

A motor driver 150 drives a main scan motor 152, and a motor driver 160 drives a subscan motor 162 to feed (subscan) the print medium 8.

(Active Nozzle Setting Sequence)

In this first embodiment, the positions of nozzles to be used for printing are set according to the normal print data transfer mode or the offset transfer mode.

Figure 8:
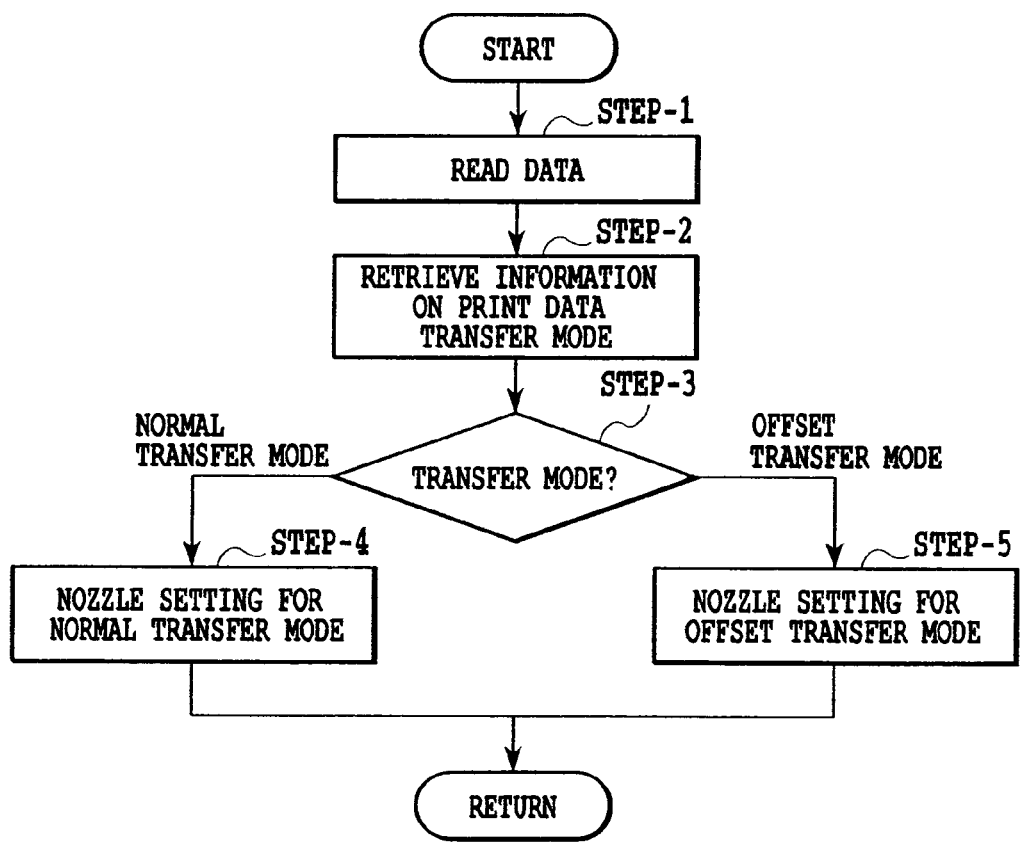
FIG. 8 is a flow chart showing an example sequence of determining nozzles to be used in a print head in the first embodiment of the present invention.

FIG. 8 shows a flow chart in this embodiment showing an example sequence of setting active nozzles in the print head. First at Step-1 data to be printed is read. Next, Step-2 retrieves information on the print data transfer mode from header information attached to the print data. Then, Step-3 discriminates the transfer mode and, if the normal print data transfer mode is specified, Step-4 performs the nozzle setting for the normal print data transfer mode. If the discrimination indicates the offset transfer mode, Step-5 performs the nozzle setting for the offset transfer mode.

In this way, according to whether the print data transfer mode information specifies the normal print data transfer mode or the offset transfer mode, the nozzle setting can be made accordingly. Since the header information is normally attached to the front end of the print data, the active nozzle positions can be switched between the normal print data transfer mode and the offset transfer mode for each printing job or for each page.

Although in the above embodiment the explanation has been made for the one-pass bidirectional printing, a multipass printing may also switch the active nozzle position setting between the normal print data transfer mode and the offset transfer mode. In this case, the control sequence is similar to that shown in FIG. 8 and similar effects can be expected.

Second Embodiment

Next, a second embodiment of this invention will be described.

Figure 9:
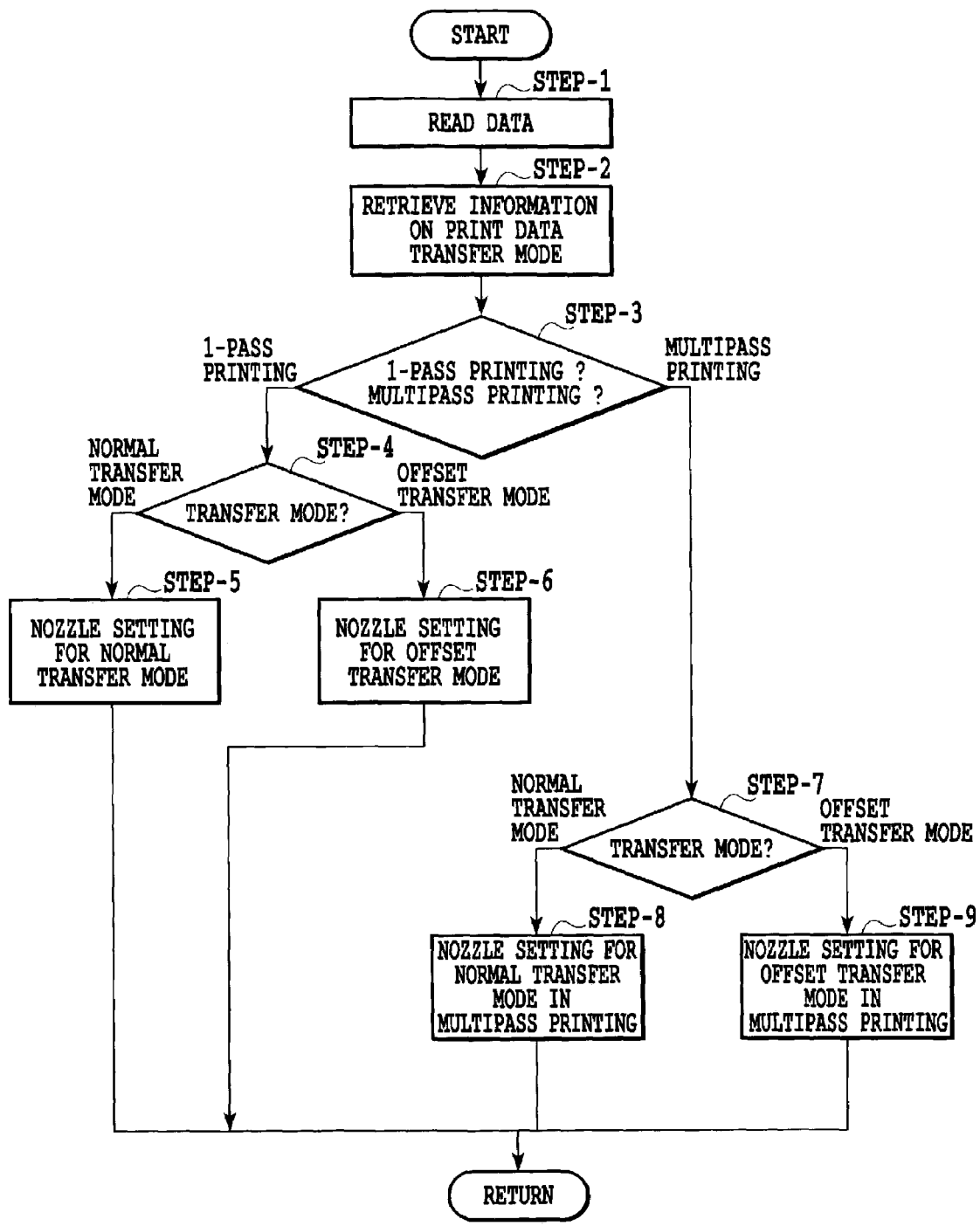
FIG. 9 is a flow chart showing an example sequence of determining nozzles to be used in a print head in a second embodiment of the present invention.

In the second embodiment, as shown in FIG. 9, the active nozzle positions are selected for the one-pass bidirectional printing and for the multipass printing, independently of each other.

In FIG. 9, data to be printed is read at Step-1. Next, Step-2 retrieves information on the print data transfer mode from the header information attached to the print data. Then, Step-3 discriminates whether the printing mode specified is the one-pass mode or multipass mode. If it is discriminated that the one-pass printing mode is specified, Step-4 discriminates the print data transfer mode. If it is discriminated that the normal print data transfer mode is specified, Step-5 performs the active nozzle position setting for the normal print data transfer mode. If the offset transfer mode is found specified, Step-6 performs the active nozzle position setting for the offset transfer mode.

If Step-3 finds that the multipass printing mode is specified, Step-7 further discriminates the print data transfer mode. If this discrimination finds that the normal print data transfer mode is specified, Step-8 performs the active nozzle position setting for the normal print data transfer mode of the multipass printing mode. If the discrimination of Step 7 finds the offset transfer mode as the specified mode, Step-9 performs the active nozzle position setting for the offset transfer mode.

As described above, in either the one-pass printing or the multipass printing, the active nozzle position setting can be made according to the print data transfer mode information, i.e., according to the normal print data transfer mode or the offset transfer mode. Normally, the header information is attached at the start of the print data and therefore the active nozzle position setting can be switched between the normal print data transfer mode and the offset transfer mode for each printing job or for each page. As in the one-pass bidirectional printing, the active nozzle positions in the print head can be selectively set also in the multipass printing with the normal print data transfer mode and in the multipass printing with the offset transfer mode.

As described above, this embodiment allows printing to be executed by using those nozzle positions optimally selected for the print data transfer mode specified. That is, in the normal print data transfer mode, active nozzles can be set at positions as appropriate for printing as can be realized with the available memory capacity. In the offset transfer mode, optimum nozzle positions for high quality printing with no image impairment, such as color variations, can be selectively set and used for printing. Thus, both the normal print data transfer mode and the offset transfer mode can be performed with one printing apparatus.

The present invention achieves distinct effects when applied to a recording head or a recording apparatus which has means for generating thermal energy, such as electrothermal transducers or laser light, and which causes changes in ink by the thermal energy so as to eject ink. This is because such a system can achieve high density and high resolution recording.

A typical structure and operational principle thereof is disclosed in U.S. Pat. Nos. 4,723,129 and 4,740,796, and it is preferable to use this basic principle to implement such a system.

Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laid-open Nos. 59-123670 (1984) and 59-138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multicolor and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.-70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through-holes formed in a porous sheet as liquid or solid substances so that the ink faces the electrothermal transducers as described in Japanese Patent Application Laid-open Nos. 54-56847 (1979) or 60-71260 (1985). The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

As described above, with this invention, since the active nozzle positions in the print heads are set according to the mode in which print data is transferred from a data source, such as a host computer to the printing apparatus, a desired printing operation can reliably be executed. For example, when the print data is transferred to the printing apparatus from the data source in the normal print data transfer mode, printing can be done by selecting the nozzle positions suitable for high speed printing or high quality printing within possible limits. When the print data is transferred in the offset transfer mode, optimum nozzle positions for high quality printing with no image impairment such as color variations can be selectively set and used for printing. This allows the printing apparatus to perform high speed printing and high quality printing according to the print data transfer mode.

The present invention has been described in detail with respect to preferred embodiments, and it will now be apparent from the foregoing to those skilled in the art that changes and modifications may be made without departing from the invention in its broader aspects, and it is the intention, therefore, that the appended claims cover all such changes and modifications as fall within the true spirit of the invention.

What is claimed is:

1. An ink jet printing apparatus having printing means, wherein the printing means, having a plurality of print heads, each formed with a plurality of nozzles, performs printing onto a print medium while the plurality of print heads are scanned across the print medium, wherein each time a print head performs printing while being scanned across the print medium, the print head conducts printing in a respective predetermined print area defined by an entirety of the area which can receive ink during a respective pass of the printhead across the print medium, the print heads being adapted to eject different kinds of ink onto the print medium to form an image according to print data transferred from a predetermined print data source, among the plurality of print heads, a print head for ejecting a specific kind of ink is formed with nozzles along a nozzle arrangement direction, a nozzle arrangement in the nozzle arrangement direction in the print head for ejecting the specific kind of ink being more than twice as long as a nozzle arrangement in a nozzle arrangement direction in another print head, and a portion of the nozzle arrangement in the print head for ejecting the specific kind of ink corresponding to printing positions different from printing positions printed by nozzles in the other print head being longer than the length of the nozzle arrangement of the other print head, the ink jet printing apparatus comprising:

print buffers for storing print data corresponding to each of the print head for ejecting the specific kind of ink and the other print head, a capacity of the print buffer corresponding to the other print head being smaller than a capacity of the print buffer corresponding to the print head for ejecting the specific kind of ink;

discrimination means for discriminating a data transfer mode of the print data transferred from the predetermined print data source as to whether the transfer mode is:

a first print data transfer mode for supplying to the print head for ejecting the specific kind of ink and the other print head, print data for printing, at substantially the same time, on one and the same first predetermined print area on the print medium, or a second print data transfer mode for supplying, to the print head for ejecting the specific kind of ink and the other print head, respective print data, to be printed, at substantially the same time, by the print head for ejecting the specific kind of ink and the other printhead, wherein the print data to be printed by the other print head encompasses the first predetermined print area, and the print data to be printed by the print head for ejecting the specific kind of ink encompasses a second predetermined print area which is different from the first predetermined print area, wherein the first predetermined print area does not include the second predetermined print area; and print head control means for setting a range of the nozzles to be used during the scanning of the printing means, from among the plurality of the nozzles arranged in the print head for ejecting the specific kind of ink, based on the result of the discrimination means, wherein, in the first print data transfer mode, the print head control means sets the range of the nozzles so as to use a nozzle, in a range corresponding to the first predetermined print area, from among the nozzles arranged in the print head for ejecting the specific kind of ink, and wherein, in the second print data transfer mode, the print head control means sets the range of the nozzles so as to use nozzles, in a range corresponding to the second predetermined print area, from among the nozzles arranged in the print head for ejecting the specific kind of ink.

2. An ink jet printing apparatus according to claim 1, wherein the discrimination means discriminates whether the data transferred has been transferred in the first data transfer mode or in the second data transfer mode.

3. An ink jet printing apparatus according to claim 1, wherein said print head control means sets, in each of the print heads independently, positions of those of the plurality of nozzles that are to be used for printing according to the print data transfer mode and a plurality of printing modes.

4. An ink jet printing apparatus according to claim 3, wherein the plurality of printing modes include a one-pass printing mode which forms an image by scanning one and the same nozzle group once over one and the same print area and a multipass printing mode which forms an image by scanning a plurality of different nozzle groups over one and the same print area a plurality of times.

5. An ink jet printing apparatus according to claim 1, wherein the print heads generate bubbles in ink by thermal energy and eject ink by energy produced by the bubbles.

6. An ink jet printing method using printing means, wherein the printing means, having a plurality of print heads, each formed with a plurality of nozzles, performs printing onto a print medium while the plurality of print heads are scanned across the print medium, wherein each time a print head performs printing while being scanned across the print medium, the print head conducts printing in a respective predetermined print area defined by an entirety of the area which can receive ink during a respective pass of the printhead across the print medium, the print heads being adapted to eject different kinds of ink onto the print medium to form an image according to print data transferred from a predetermined print data source, among the plurality of print heads, a print head for ejecting a specific kind of ink is formed with nozzles along a nozzle arrangement direction, a nozzle arrangement in the nozzle arrangement direction in the print head for ejecting the specific kind of ink being more than twice as long as a nozzle arrangement in a nozzle arrangement direction in another print head, a portion of the nozzle arrangement in the print head for ejecting the specific kind of ink corresponding to printing positions different from printing positions printed by nozzles in the other print head being longer than the length of the nozzle arrangement of the other print head, and the printing means utilizing print buffers for storing print data corresponding to each of the print head for ejecting the specific kind of ink and the other print head, a capacity of the print buffer corresponding to the other print head being smaller than a capacity of the print buffer corresponding to the print head for ejecting the specific kind of ink, the ink jet printing method comprising:

a discrimination step for discriminating a data transfer mode of the print data transferred from the predetermined print data source as to whether the transfer mode is:

a first print data transfer mode for supplying to the print head for ejecting the specific kind of ink and the other print head, print data for printing, at substantially the same time, on one and the same first predetermined print area on the print medium, or a second print data transfer mode for supplying, to the print head for ejecting the specific kind of ink and the other print head, respective print data, to be printed, at substantially the same time, by the print head for ejecting the specific kind of ink and the other printhead, wherein the print data to be printed by the other print head encompasses the first predetermined print area, and the print data to be printed by the print head for ejecting the specific kind of ink encompasses a second predetermined print area which is different from the first predetermined print area, wherein the first predetermined print area does not include the second predetermined print area; and a nozzle setting step for setting a range of the nozzles to be used during the scanning of the printing means, from among the plurality of the nozzles arranged in the print head for ejecting the specific kind of ink, based on the result of the discrimination step, wherein in the first print data transfer mode, the nozzle setting step sets the range of the nozzles so as to use a nozzle, in a range corresponding to the first predetermined print area, from among the nozzles arranged in the print head for ejecting the specific kind of ink, and wherein, in the second print data transfer mode, the nozzle setting step sets the range of the nozzles so as to use nozzles, in a range corresponding to the second predetermined print area, from among the nozzles arranged in the print head for ejecting the specific kind of ink.

* * * * *